Patented Dec. 30, 1930

1,787,408

UNITED STATES PATENT OFFICE

FRIEDRICH POSPIECH, OF DRESDEN, GERMANY, ASSIGNOR TO CHEMISCHE FABRIK POTT & CO., OF DRESDEN, GERMANY

CONDENSATION PRODUCT OF AROMATIC SULPHONIC ACIDS

No Drawing. Application filed December 30, 1926, Serial No. 158,130, and in Germany December 31, 1925.

This invention has reference to wetting, emulsifying and washing agents and to agents adapted to reduce the surface tension of liquids, and in view thereof the invention is more particularly concerned with condensation products from aromatic sulphonic acids with unsaturated hydrocarbons as the most suitable and prominent representatives of this class of chemical substances, and with methods of facilitating the manufacture of such products. More specifically speaking the invention devises a process for the manufacture of condensation products of aromatic, especially poly-nuclear hydrocarbons and of their sulphonic acids with unsaturated hydrocarbons of the group of the olefines.

I have ascertained in the course of my experiments that aromatic hydrocarbons, particularly naphthalene and its substitution products, and preferably after conversion into a water-soluble condition by sulphonation, are adapted to combine with a plurality of olefine-hydrocarbons in the presence of condensing agents, such as sulphuric acid. A series of novel, peculiar condensation products are thus obtained which are very well adapted for use for a variety of industrial purposes.

In carrying out this condensation it is necessary to adhere to certain conditions, in order to prevent the olefines from entering into the aromatic nucleii as simple alcohol-radicals, that is to say in the shape of unattacked side-chains. In this connection it is a point of chief importance to keep the concentration or the quantity of the condensing agent at such a high value that the tendency of the olefines, to hydrolyze in the presence of water into the corresponding alcohols, is substantially obviated. It therefore becomes necessary in the practical execution of the condensing process to minimize the possibility of the formation of water or the presence thereof, the admissible minimum limit varying with each case. By operating in this manner the direct substitution and the otherwise occurring formation of nuclear-substituted compounds are avoided entirely.

It is preferable to conduct the process under conditions adapted to produce oxidation. This object may be accomplished by a suitable selection of the kind and quantity of the condensing agent or by the simultaneous employment of special oxidizing agents, as for instance, per-oxides, per-salts, chromic acid, or the blowing in of oxidizing gases, air, oxygen and the like. The condensation is caused to proceed at temperatures below 100° C., and always in the presence of an excess of sulphuric acid. The separation of the substances produced from by-products and from the excess of reagents is effected by eliminating the oil-like condensation products from the reaction mixture diluted with water, provided the condensation products are insoluble in water; or the water-soluble products of sulphonation may be precipitated by means of strong sulphuric acid in which most are practically insoluble. These products may preferably be submitted to a further purification by the treatment with lime and soda, and by the crystallizing out of by-products. The alcohols employed may preferably be of the class of the secondary alcohols.

The condensation products obtainable by my invention represent more of less viscid amorphous substances which, comprising sulphonic acids, are extensively soluble in water. In view of this property and the fact of becoming dissolved also in the presence of relatively strong, acid, neutral or alkaline electrolytes these aqueous solutions are distinguished by being highly insensitive to the action of liquids containing electrolytes, and this quality greatly assists in the industrial applicability of the products. Besides, the new condensation products are readily soluble in water in the form of the alkali metal salts of their sulphonic acids. These alkali metal salts are likewise amorphous and highly resistant to the action of electrolytes.

As materials to start with I may particularly employ cyclic compounds with several nucleii, such as naphthalene, anthracene, phenanthrene, acenaphthene and the like as such, or better still, in the form of their mono- or poly-sulphonic acids, and on the other hand, olefine having three or more carbon-atoms in their chain, or mixtures of olefines. Also, halogen-naphthalenes, nitro-naphthalene, amino-naphthalenes, naphthalene carboxylic acids, naphthols, and so-called functional derivatives of these compounds, such as their ethers, esters, amids, chlorides and the like, and the corresponding compounds of the other aromatic hydrocarbons are suitable in this connection.

I may also employ ring-shaped hydrocarbons with olefinic characteristics, such as for instance, dihydrobenzol and tetra-hydrobenzol, and substitution products of aliphatic olefines with aromatic radicals, as for instance styrol may likewise be employed as a basis. It has been ascertained that favorable results can only be obtained by starting with those olefines in which the carbon-atoms on each side of the double bond are each combined with a free atom of hydrogen. If for instance asymmetrically di-substituted olefines are employed the condensing reaction either fails to occur, or the condensation runs out into an uncontrollable polymerization and resinification.

The condensation products thus obtained preferably in the form of sulphonic acids or their salts are capable of very extensive application in the arts and for industrial purposes. Their most conspicuous property is the fact that they produce an enormous reduction of the surface-tension of aqueous solutions. In view thereof they are adapted to accomplish the very important function in practical operation of furnishing a foaming capacity greatly in excess of that of ordinary soaps. They are not affected by acid liquors, and possess extraordinary emulsifying properties. This emulsifying capacity is particularly noticeable in combination with all, otherwise water-insoluble liquids and solid substances, such as mineral oils, fats, resins, terpenes, aromatic hydrocarbons and the like, so that they will serve very valuable purposes in connection with all kinds of washing and cleaning processes. Aside from that they are adapted to convert even water-insoluble substances into clear aqueous solutions, which latter upon further dilution with water yield highly dispersed inseparable emulsions. It therefore becomes possible to employ such solvents which are generally utilized as fat-solvents, particularly in the textile arts in combination with these condensation products in all industrial washing and cleaning methods. Furthermore it should be pointed out that all textile and other fibrous material, such as felts, leather, card-board, paper and the like on being impregnated with solutions of the condensation products referred to acquire a considerably increased absorbing and sucking capacity and increased wetting properties. This latter property adapts the new products of this invention either when in dilute aqueous solution by themselves or in combination with the otherwise water-insoluble fat-solvents above referred to as specific wetting agents for the entire textile, paper and leather arts. The permanency of the condensation products in acid liquors and in liquids containing electrolytes makes it possible to employ these products as wetting agents, in connection with the carbonization of wool, in acid dyeing liquors and in connection with all processes of the textile and leather industries. It may be noted here that the capacity of these bodies for forming wetting, emulsifying, foaming, detergent and dispersing agents with organic fat-solvents forms the subject matter of a divisional application filed by me.

Examples for the carrying out of the invention:

1. A mixture of alpha- and beta-naphthalene-sulphonic acids obtained by heating naphthalene for several hours with a sufficient quantity of concentrated sulphuric acid, is caused to react with a mixture obtained by passing propylene and other high molecular weight olefines into concentrated sulphuric acid. The olefine-mixture should contain the olefines in molecular proportions with relation to the weight of the naphthalene employed, that is to say at least 1 molecule of naphthalene to 2 of olefine. Care should be taken that the mass which becomes heated by itself, does not acquire any higher temperatures than 100° C. The amount of sulphuric acid should be regulated in such a manner that at the conclusion of the operation there will be present in the reaction mixture at least 5 molecules of sulphuric acid for each molecule of naphthalene employed. The reaction mixture separates into two layers of which the upper viscid layer constitutes the desired condensation product and may be further treated in the usual manner with lime and soda; or, as it is produced in almost pure condition, it may be utilized directly without any purifying operation.

2. 100 kilograms of naphthalene are heated with 150 kilograms of concentrated sulphuric acid to temperatures above 100° C. and until a clear solution of the mixture has been obtained. After cooling the product to 85° C. it is treated with small successive amounts of a mixture of 135 kilograms of tetra-hydrobenzol and 135 kilograms of concentrated sulphuric acid, which mixture has been prepared so as to avoid the self-heating thereof. The temperature of the reaction should not exceed 90° C. After some time a separation takes place in the reaction-mass with the elimination as the upper layer of about 330 kilograms of a very viscid condensation product which is then further treated as outlined with reference to Example 1, or which may be utilized for any suitable industrial or similar purpose.

The examples, amounts of material and modes of operation hereinbefore given should be considered merely as illustrations or exemplifications of possible embodiments of the principles of my invention, and are not to be regarded as limitations, except as may otherwise appear from the appended claims, and it may be particularly pointed out that aliphatic, ring-constituted or aryl-substituted olefines may be employed in connection with my invention.

I claim:—

1. The process of producing condensation products of poly-nuclear cyclic compounds with olefines, which comprises heating polynuclear cyclic compounds with olefines in the presence of concentrated sulphuric acid to temperatures below 100° C.

2. The process of producing condensation products, which comprises heating polynuclear cyclic compounds with olefine bodies in the presence of an excess of concentrated sulphuric acid at temperatures below 100° C.

3. The process of producing condensation products, which comprises heating polynuclear cyclic compounds with olefine bodies in the presence of an oxidizing agent and in the presence of sulphuric acid to temperatures below 100° C.

4. The process of producing condensation products, which comprises heating polynuclear cyclic compounds with olefine bodies in the presence of an excess of sulphuric acid to temperatures below 100° C. and blowing air into the heated mixture during the heating treatment.

5. The process of producing condensation products, which comprises heating polynuclear cyclic compounds with olefine bodies in the presence of an excess of concentrated sulphuric acid and an oxidizing agent to temperatures below 100° C.

6. The process of producing condensation products, which comprises heating sulphonated polynuclear cyclic compounds with olefine bodies in an excess of concentrated sulphuric acid to temperatures below 100° C.

7. The process of producing condensation products, which comprises heating sulphonated polynuclear cyclic compounds with olefine hydrocarbons in an excess of concentrated sulphuric acid to temperatures below 100° C. and in the presence of air.

8. The process of producing condensation products, which comprises heating sulphonated aromatic polynuclear hydrocarbons with olefine hydrocarbons having at least three carbon atoms in an excess of concentrated sulphuric acid to a temperature below 100° C. and blowing air into the mixture during the heating treatment.

9. The process of producing condensation products, which comprises treating sulphonated aromatic polynuclear hydrocarbon bodies with ring constituted olefinic bodies in an excess of concentrated sulphuric acid at temperatures below 100° C.

10. The process of preparing condensation products, which comprises heating polynuclear aromatic compounds with olefinic hydrocarbons containing a free hydrogen atom on each side of the double bond, and in the presence of an excess of concentrated sulphuric acid at a temperature below 100° C.

11. As new articles of manufacture, condensation products of polynuclear cyclic compounds and olefine hydrocarbons, said products being of a somewhat viscous but liquid nature, soluble in water and not influenced by electrolytes, suitable for use as wetting, emulsifying and detergent agents.

12. As new articles of manufacture, condensation products of sulphonated aromatic polynuclear compounds and olefine hydrocarbons having more than two carbon atoms in the chain, said products being of a somewhat viscous, liquid character, being soluble and substantially stable in water in the presence of electrolytes and being suitable for use as wetting, emulsifying and detergent agents.

13. The process of forming condensation products of polynuclear cyclic compounds with olefines which comprises heating a mixture of said compounds with sulphuric acid in such amounts and under such conditions as to prevent the hydrolysis of the olefines.

14. The process of producing condensation products of naphthalenes with olefines, which comprises heating a mixture of sulphonated naphthalenes and olefines with an excess of sulphuric acid at temperatures below 100° C.

15. The process as in claim 14, wherein air is blown through the mixture during the heating step.

16. As new articles of manufacture, condensation products of polynuclear cyclic hydrocarbons and olefine hydrocarbons, said products being of a somewhat viscous but liquid nature, and being after sulfonation soluble in water and not influenced by electrolytes, suitable for use as wetting, emulsifying and detergent agents.

FRIEDRICH POSPIECH.